United States Patent [19]

Scholz

[11] 4,096,514
[45] Jun. 20, 1978

[54] PLAYBACK CIRCUIT FOR A RECORDED THREE-LINE SEQUENTIAL COLOR TELEVISION SIGNAL

[75] Inventor: Werner Scholz, Gehrden, Germany

[73] Assignee: Ted Bildplatten Aktiengesellschaft, Zug, Switzerland

[21] Appl. No.: 722,338

[22] Filed: Sep. 10, 1976

[30] Foreign Application Priority Data

Sep. 17, 1975 Germany ............................ 2541348

[51] Int. Cl.² ............................................. H04N 9/42
[52] U.S. Cl. ......................................... 358/11; 358/4
[58] Field of Search .............................. 358/4, 11, 14

[56] References Cited

U.S. PATENT DOCUMENTS

| 3,871,019 | 3/1975 | Bingham | 358/4 |
|---|---|---|---|
| 4,052,736 | 10/1977 | Griffiths | 358/14 |

FOREIGN PATENT DOCUMENTS

| 2,446,376 | 4/1975 | Germany | 358/4 |

*Primary Examiner*—John C. Martin
*Attorney, Agent, or Firm*—Spencer & Kaye

[57] ABSTRACT

In a playback circuit for a three-line sequential color television signal, which includes a memory presenting four outputs providing, respectively, the undelayed sequential signal and the sequential signal delayed by one, two and three horizontal picture line scanning periods, a combining arrangement connected to the four outputs to combine the signals thereat into a difference signal, and a further combining arrangement for adding the difference signal to the original three-line sequential signal, the circuit is simplified by constructing the memory to cause the signals at its four outputs to have identical amplitudes and by combining the signals at the four outputs of the memory by means of four electrically identical combining components, the undelayed sequential signal and the signal delayed by three picture lines having their polarities reversed relative to the signals delayed by one and two picture lines.

4 Claims, 3 Drawing Figures

PLAYBACK CIRCUIT FOR A RECORDED THREE-LINE SEQUENTIAL COLOR TELEVISION SIGNAL

BACKGROUND OF THE INVENTION

The present invention relates to a circuit for playing back three-line sequential color television signals, particularly for use in a video disc player.

It is already known in the art to record a color television signal on a recording device having a narrow bandwidth, typically about 3 MHz, by recording the three color component signals representing the primary colors in line-by-line alternance and, during playback, to make signals representing the three color components simultaneously available by employing a series connection of two line delay lines, as disclosed in German Pat. No. 1,261,876 and corresponding U.S. Pat. No. 3,560,635, issued to Walter Bruch.

In this connection, it is also known to effect this sequential recording of the primary color signals only in the lower frequency band of about 0–0.5 MHz and to record during each picture line period a luminance signal in the upper frequency band of about 0.5–3 MHz. During playback, the signals in these two frequency bands coming from the recording device are first separated by a frequency filter and directed into two respective channels. The first channel permits only signal components in the lower frequency range to pass and processes the sequential color signals. The second channel permits only the signal components in the upper frequency band to pass, i.e. it furnishes the high frequencies of the luminance signal which are subsequently recombined with the processed signals in the lower frequency band.

In such a circuit, the signal components in the lower frequency band always pass only through the first channel. Thus all interferences and errors occurring in the first channel, e.g. distortions from modulators, delay lines and filters, become fully effective even in the case of a monochrome picture signal.

It is known to reduce these errors, as disclosed in German Pat. No. 2,207,021 and corresponding U.S. Pat. No. 3,808,359 issued to Werner Scholz, by transmitting signal components in the first frequency band also in the second channel and adding a difference signal in this channel, which difference signal is obtained by a special matrixing of the signals from the first channel. Preferably, the signals are combined at the outputs of a series arrangement of delay lines, each effecting a delay of one horizontal scanning line period, in a certain amplitude ratio to form the difference signal.

A playback circuit for such three-line sequential color television signals is also disclosed in German Offenlegungsschrift [Laid Open Application] No. 24 46 376, in which a third delay line having the same delay period is disposed in series with the series circuit of the two above-mentioned delay lines. The difference signal is then formed by utilizing the input signal to the series circuit and the signals at the outputs of the three delay lines.

This playback circuit is particularly suitable for the playback of a signal which is subject to predistortion during recording. This predistortion, which is also described in German Offenlegungsschrift No. 24 46 376, serves the purpose of reducing the errors occuring during playback upon the occurrence of substantial transitions in the vertical direction, i.e. at the horizontal edges, as a result of the trisequential operation. The predistortion substantially involves averaging of a plurality of lines of the sequential signals.

The known playback circuit having a total of three delay lines is of relatively complicated structure because individual signals which have different amplitudes have to be combined to form the luminance difference signal. This special requirement for different amplitudes also makes matching of the components of this playback circuit relatively difficult.

SUMMARY OF THE INVENTION

It is an object of the present invention to simplify such circuit structure and matching in a circuit of the above-described type.

This and other objects are achieved, according to the present invention, in a playback circuit for a three-line sequential color television signal, which includes a memory composed of three delay lines connected together in series, each delay line producing a signal time delay equal to one horizontal picture line scanning period, one end of the resulting series arrangement being connected to receive the color television signal, and four outputs connected, respectively, to the one end of the series arrangement and to the output of each delay line to provide the undelayed sequential signal and the sequential signal delayed by one, two and three horizontal picture lines, respectively, a combining unit connected to the four outputs to combine the signals thereat into a difference signal, and an adding unit connected for adding the difference signal to the three-line sequential signal, by constructing the memory for causing the signals at the four outputs to have identical amplitudes, and by constituting the combining unit of four electrically identical combining components each connected to a respective one of the outputs and of elements connected for reversing the polarity of the undelayed signal and the signal delayed by three picture lines relative to the signal delayed by one and two picture lines.

It can be mathematically proven that the particularly simple circuit according to the present invention produces the same end result in the signal combination as the known circuit, but with simpler circuitry. Due to the fact that the four signals are combined at the outputs of the series circuit of the delay lines with the same amplitudes and via identical components, the circuit structure and matching are made much simpler. This also avoids delay errors in the signals to be combined. The combination can be with respect to signals at the video frequency or carrier frequency. For carrier frequency combination, the simplified circuit also substantially eliminates phase errors in the combined signals.

DESCRIPTION OF THE PREFERRED EMBODIMENTS

Figure 1:
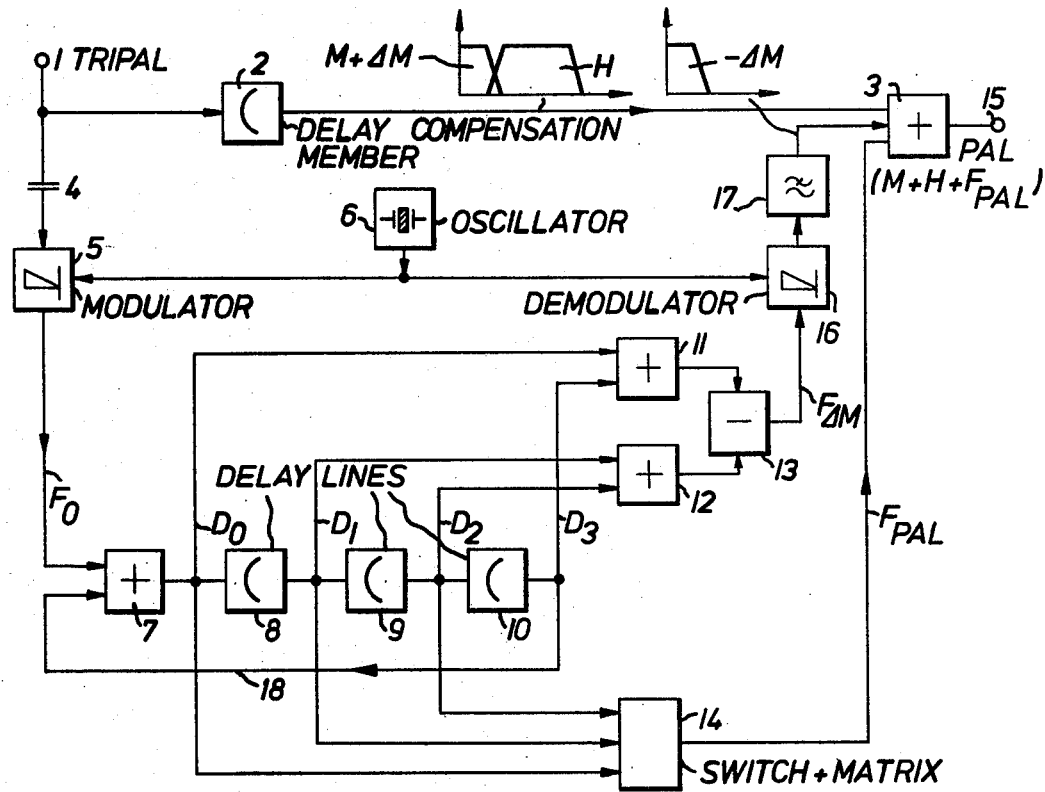
FIG. 1 is a block circuit diagram of a preferred embodiment of a playback circuit according to the present invention.

In the circuit shown in FIG. 1, a three-line sequential signal coming from a video record disc player is transmitted from a terminal 1 via a delay member 2 provided for delay compensation and is fed to an adder stage 3 and, via a capacitor 4, to a modulator 5. The carrier signal for the modulator 5 is generated in a quartz oscillator 6. The signal from delay member 2 contains, in a lower frequency band, a luminance signal M and a luminance difference signal Δ M, Δ M being a shorthand designation of the sequential signal components R-M, G-M, B-M in the lower frequency band, containing the color information, in each case M being the luminance signal of the lower frequency band.

The circuit further includes an adder stage 7, three delay lines 8, 9 and 10, each producing a delay of one line scanning period, adder stages 11 and 12, a subtracting stage 13, and a circuit 14 including the usual line frequency switch and PAL matrix. In circuit 14, a PAL chrominance carrier $F_{PAL}$ is obtained in a known manner from the undelayed signal $D_0$, a signal $D_1$ which appears at the output of line 8 and has been delayed by one horizontal picture line period, and a signal $D_2$ which appears at the output of line 9 and has been delayed by two horizontal picture line periods. This PAL chrominance carrier $F_{PAL}$ is added to the luminance signal in adder stage 3 to form an FBAS signal. A complete PAL-FBAS signal is then present at terminal 15.

In the circuit including stages 11, 12 and 13, signals $D_0$, $D_1$, $D_2$ and $D_3$ are then combined to form signal $F_{\Delta M}$, which is a carrier signal from oscillator 6 at the chrominance carrier frequency modulated by the above-defined difference signal Δ M. This signal is demodulated in a demodulator 16, which receives the carrier signal coming from oscillator 6, and fed, via a lowpass filter 17, as a correction signal component — Δ M to adder stage 3. Thus the luminance difference signal Δ M in the lower frequency band is eliminated in the manner explained in German Pat. No. 22 07 021 and corresponding U.S. Pat. No. 3,808,359. Between the output and input of the series connection of the three delay lines 8, 9 and 10 a feedback path 18 is provided in the manner, and for the purpose, disclosed in German Offenlegungsschrift No. 24 46 376.

It can be seen that, according to the invention, the signals $D_0$, $D_1$, $D_2$ and $D_3$ which are combined have the same amplitudes and are combined by means of identical components, i.e. in complete symmetry, to form the signal $F_{\Delta M}$. It is assumed in this connection that delay lines 8, 9 and 10 have no attenuation or that such attenuation is always compensated by series-connected amplifiers. In FIG. 1 carrier modulated signals are being combined. The signals fed to stages 11 and 12 thus all have the same amplitude and phase.

Figure 2:
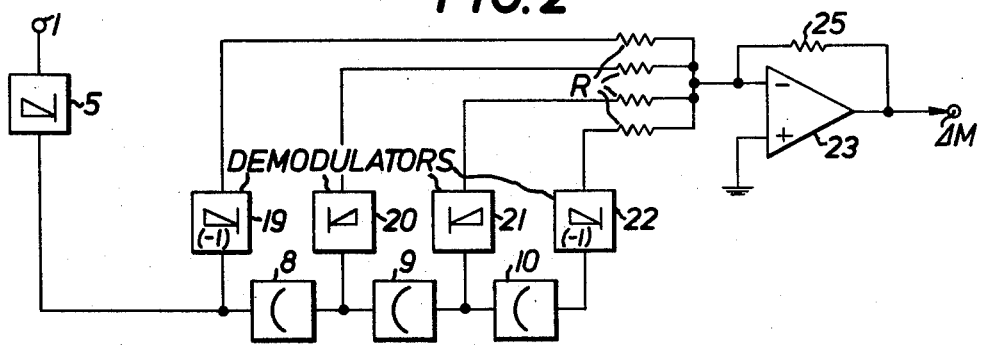
FIG. 2 is a circuit diagram of a preferred practical embodiment of a portion of the circuit of FIG. 1 for combining video frequency signals.

In the circuit shown in FIG. 2 the signals which are combined are video frequency signals. The signals at the four outputs of the series circuit 8, 9, and 10 are demodulated in demodulators 19, 20, 21 and 22, respectively, demodulators 19 and 22 simultaneously effecting a polarity reversal. This produces the correct matrixing. These signals are fed via four identical resistors R to an input of an amplifier 23. The signal appears at the output of amplifier 23 in a form similar to that at the output of stage 13 of FIG. 1, i.e., as a signal Δ M, but now in video frequency form. If the circuit of FIG. 2 were employed in the embodiment of FIG. 1, this signal can be fed directly to lowpass filter 17 so that demodulator 16 could be eliminated. Resistor 25 is provided to give amplifier 23 a low input resistance.

Figure 3:
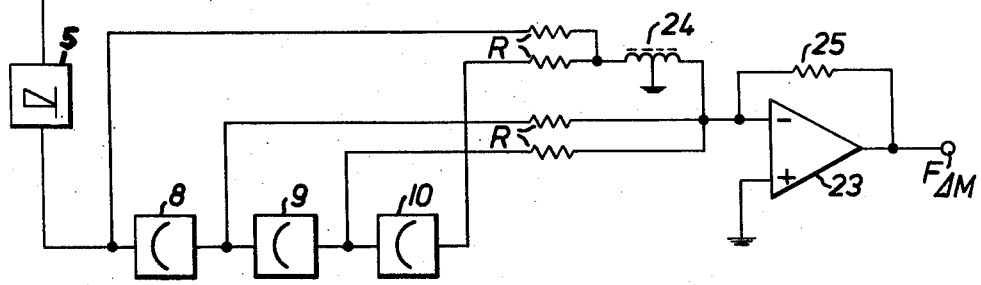
FIG. 3 is a circuit diagram of a preferred embodiment of a circuit portion corresponding to that of FIG. 2 for combinding carrier frequency signals.

FIG. 3 shows the corresponding circuit for signals modulated onto the carrier. These are fed, as in FIG. 2, via four identical resistors R to the input of amplifier 23. At its output amplifier 23 furnishes the signal $F_{\Delta M}$, which corresponds to the identically marked signal at the output of stage 13 in FIG. 1. The polarity reversal is here effected by means of a bifilar-wound coil 24 whose center tap is grounded. One end of coil 24 is connected to the amplifier signal input and to the resistors R whose other ends are connected to the outputs of delay lines 8 and 9. The other end of coil 24 is connected to the resistors R whose other ends are connected to the input of line 8 and the output of line 10. The signal passed to modulator 5 is the same signal as illustrated at the output of delay member 2 and includes frequency portions M + ΔM + H. This is the original video output signal from the recorder.

It will be understood that the above description of the present invention is susceptible to various modifications, changes and adaptations, and the same are intended to be comprehended within the meaning and range of equivalents of the appended claims.

What is claimed is:

1. In a playback circuit for a three-line sequential color television signal, which circuit includes memory means composed of three delay lines connected together in series, each delay line producing a signal time delay equal to one horizontal picture line scanning period, means connecting one end of the resulting series arrangement of the memory means to receive the color television signal, means connected to the one end of the series arrangement and to the output of each delay line to present four outputs providing, the undelayed sequential signal and the sequential signal delayed by one, two and three horizontal picture lines, respectively, means connected to the four outputs to combine the signals thereat into a difference signal, and means connected for adding the difference signal to the three-line sequential signal, the improvement wherein: said memory means are constructed for causing the signals at said four outputs to have identical amplitudes; and means connected to combine the signals comprise four electrically identical combining components each connected to a respective one of said outputs and means connected for reversing the polarity of the undelayed signal and the signal delayed by three picture lines relative to the signals delayed by one and two picture lines.

2. An arrangement as defined in claim 1 further comprising an amplifier and wherein each of said combining components is a resistor connected between a respective output of said memory means and a common input of said amplifier.

3. An arrangement as defined in claim 1 further comprising means connected to define a feedback path between the output of the last of said delay lines and said one end of said series arrangement.

4. An arrangement as defined in claim 1 connected to receive the three-line sequential signal from a video record disc playback device.

* * * * *